No. 872,331. PATENTED DEC. 3, 1907.
C. A. DREIER.
WATER CLOSET FITTING.
APPLICATION FILED FEB. 23, 1907.

Witnesses:

Inventor,
Charles A. Dreier,
by Rummler & Rummler,
Attorneys.

UNITED STATES PATENT OFFICE.

CHARLES A. DREIER, OF CHICAGO, ILLINOIS.

WATER-CLOSET FITTING.

No. 872,331.　　　Specification of Letters Patent.　　　Patented Dec. 3, 1907.

Application filed February 23, 1907. Serial No. 358,908.

*To all whom it may concern:*

Be it known that I, CHARLES A. DREIER, a citizen of the United States of America, and a resident of Chicago, county of Cook, State of Illinois, have invented certain new and useful Improvements in Water-Closet Fittings, of which the following is a specification.

This invention relates to pipe fittings and has particular reference to a form of joint suited for the connection between a water closet and the waste pipe.

Figure 1:
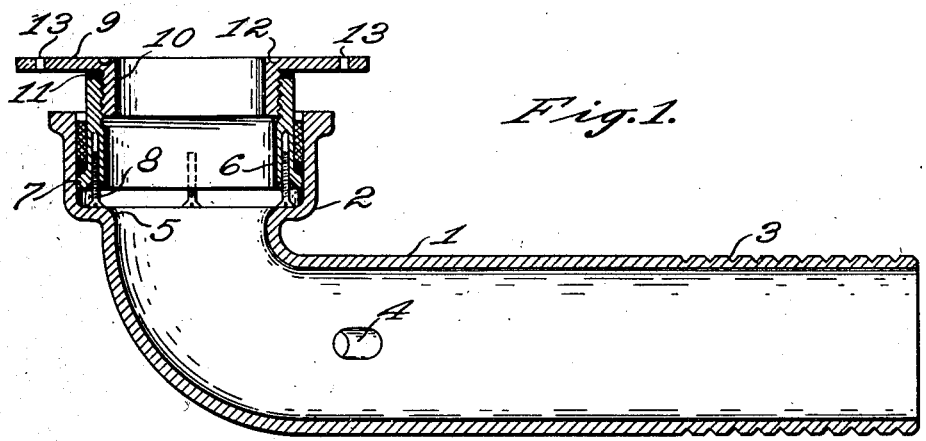
Figure 2:
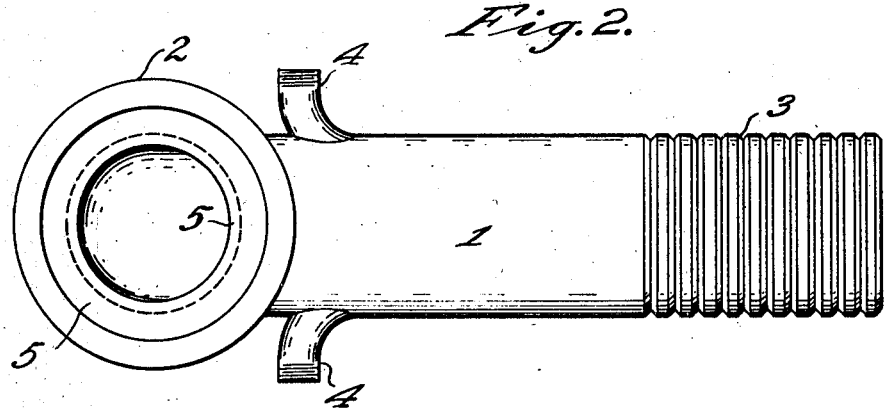

The main objects of this invention are to provide an adjustable calked joint for pipes; to provide a form of pipe joint which, while occupying but little space, may be readily adjusted through a considerable range to suit various conditions; and to provide a structure for joints of this class which will be secure against leakage of water or gases in any position of adjustment, and which will be at the same time inexpensive, strong, and of such a nature as to insure a tight joint even though the parts are assembled by a careless person. These objects are accomplished by the device shown in the accompanying drawings, in which:

Figure 1 is a longitudinal section of a water closet bend constructed according to this invention. Fig. 2 is a top plan of the same with the flange and thimble omitted.

In the construction shown in the drawings, the bend 1 comprises a pipe having an upwardly disposed hub 2 and a horizontally disposed part having a plurality of annular grooves 3 extending circumferentially around it near its end to facilitate the cutting off of portions to suit the space in which it is to be fitted. The bend 1 is provided with two horizontally disposed branches 4 for connection to the flushing and vent pipes. The hub 2 is provided with the usual inner annular shoulder 5 at its junction with the main part of the pipe. A short thimble 6 extends into the hub as shown in Fig. 1. The thimble is provided with a bead 7 at its lower end loosely fitting the inner walls of the hub, and there is a considerable space between the outside of the thimble and the inside of the hub to provide a space for a calking of oakum and lead. A plurality of adjusting screws 8 are tapped into the lower end of the walls of the thimble 6 and bear on the shoulder 5 so as to regulate the height of the thimble within the hub 2. These screws are preferably flat-head machine screws and the lower edge of the thimble is preferably counter-sunk to permit the heads to enter flush and allow the thimble to abut against the shoulder 5 if desired.

The thimble 6 is internally threaded near its outer end and engages a flange 9 which has a tubular part 10 externally threaded and fitting the threaded end of the thimble 6. A gasket 11, interposed between the upper end of the thimble and the flange 9, insures a tight joint between the thimble and flange. The flange 9 is provided with an annular groove 12, for receiving a gasket to pack the joint between said flange and the bowl of the closet. The flange is also provided with a plurality of bolt holes 13.

The operation of the device shown is as follows: After the bend 1 is placed in position, the thimble 6 is adjusted vertically in the hub by means of the adjusting screws 8 until the upper surface of the flange 9 is at exactly the right level for connection with the bowl. The flange 9 is then removed from the thimble and the joint between the thimble and hub is packed with oakum and lead in the manner which is usual in cast iron pipe joints, the lead being calked to insure a perfectly gas-tight joint. The flange 9 is then screwed back into position.

The joint which is herein shown admits of a considerable range of vertical adjustment and at the same time insures an absolutely gas and water tight joint in any position of adjustment. The joint is also simple and requires no special skill on the part of the mechanic for the assembling or adjusting thereof.

What we claim as our invention and desire to secure by Letters Patent is:

1. A pipe having a hub at one end, a thimble extending into said hub and provided with screw-threaded means for adjusting it longitudinally of the hub, said hub being suitably formed to provide a space around the thimble for filling and calking the joint between said thimble and hub, a flange having threaded connection with said thimble at its outer end, and a gasket interposed between said flange and thimble.

2. A pipe having a hub at one end, a shoulder at the inner end of said hub, a thimble extending into said hub and spaced away from the inner walls thereof to permit of filling and calking the joint between said thimble and hub, screw-threaded adjusting means bearing between said shoulder and thimble for adjusting the thimble longitudinally in the hub, and a flange at the outer end of said thimble.

3. A pipe having a hub at one end, a shoulder at the inner end of said hub, a thimble extending into said hub and spaced away from the inner walls thereof to permit of filling and calking the joint between said thimble and hub, screw-threaded adjusting means bearing between said shoulder and thimble for adjusting the thimble longitudinally in the hub, a flange having screw-threaded connection with the outer end of said thimble, and a gasket sealing the joint between said flange and thimble.

4. A pipe having a hub at one end, a shoulder at the inner end of said hub, a thimble extending into said hub and spaced away from the inner walls thereof to permit of filling and calking the joint between said thimble and hub, screw-threaded adjusting means bearing between said shoulder and thimble for adjusting the thimble longitudinally in the hub, a flange having a tubular part extending into said thimble and having threaded connection therewith, and a gasket interposed between said flange and the outer end of said thimble.

5. A water closet bend having an upwardly disposed hub at one end, a thimble extending into said hub, a plurality of screws at the lower end of said thimble and adapted for adjusting the same longitudinally in the hub, said hub being arranged to permit of filling and calking the joint between said hub and thimble, a flange having threaded connection with the outer end of said thimble, and a gasket for packing the joint between said thimble and flange.

6. A water closet bend having an upwardly disposed hub at one end, a thimble extending into said hub, a plurality of screws at the lower end of said thimble and adapted for adjusting the same longitudinally in the hub, said hub being arranged to permit of filling and calking the joint between said hub and thimble, said thimble being internally threaded near its outer end, a flange having an externally threaded tubular part fitting the thread on said thimble, and a gasket interposed between the flange and the outer end of said thimble.

Signed at Chicago this 19th day of February, 1907.

CHARLES A. DREIER.

Witnesses:
E. E. McKee,
E. A. Rummler.